US005591950A

United States Patent [19]

Imedio-Ocaña

[11] Patent Number: 5,591,950

[45] Date of Patent: Jan. 7, 1997

[54] PROGRAMMABLE ELECTRONIC LOCK

[75] Inventor: Juan A. Imedio-Ocaña, San Sebastian, Spain

[73] Assignee: Talleres de Escoriaza, S.A. (TESA), Irun, Spain

[21] Appl. No.: 470,346

[22] Filed: Jun. 6, 1995

Related U.S. Application Data

[63] Continuation-in-part of Ser. No. 147,790, Nov. 4, 1993, abandoned.

[30] Foreign Application Priority Data

Nov. 4, 1992 [ES] Spain .................................... 9202223

[51] Int. Cl.[6] ........................................ G06K 7/01

[52] U.S. Cl. .................................. 235/382.5; 340/825.31

[58] Field of Search ................................ 235/382, 382.5, 235/380; 340/825.31

[56] References Cited

U.S. PATENT DOCUMENTS

| | | | |
|---|---|---|---|
| 4,095,739 | 6/1978 | Fox et al. | 235/382 |
| 4,283,710 | 8/1981 | Genest et al. | 340/149 R |
| 4,743,898 | 5/1988 | Imedio | 235/382 X |
| 5,198,643 | 3/1993 | Miron et al. | 235/382 |
| 5,260,551 | 11/1993 | Wiik et al. | 235/382 |

*Primary Examiner*—Donald T. Hajec
*Assistant Examiner*—Jeffrey R. Filipek
*Attorney, Agent, or Firm*—Morrison Law Firm

[57] ABSTRACT

A programmable electronic provides security among multiple users, allows independent use by multiple users of different types, and is modularly adaptable to various applications. Security is provided by the automatic updating of a lock code if an inserted card's key code bears a predetermined relation to the stored lock code. The present invention allows multiple types of users to access a given lock without affecting lock codes associated with other types or invalidating the stored lock codes of other users of the same type. For example, in a hotel room lock, a maid's key will not change the code for a guest's key, and other maid's keys will still open a lock after a first maid has accessed the lock if their lock codes are stored in the lock. The present invention also provides an additional functions circuit which allows add-on functions to be attached to the basic circuit to fit the needs of a particular site. Some examples of add-on functions include: a real time clock, a timetable function, a privacy function, an office function, a keyboard function, and a secret code function.

21 Claims, 3 Drawing Sheets

PROGRAMMABLE ELECTRONIC LOCK

This is a continuation-in-part of application Ser. No. 08/147,790 filed Nov. 4, 1993, now abandoned.

BACKGROUND OF THE INVENTION

The present invention relates to electronic locks, like the type used on hotel room doors. Generally, this type of lock includes: an encoded magnetic card, a card reader, a code verification circuit, and an electromechanical means for opening a lock. This type of lock allows opening when a code stored on a card is verified against a code stored in the lock. This particular lock is an improvement on Applicant's U.S. Pat. No. 4,793,898, issued on Apr. 23, 1987 (hereinafter, "the '898 patent").

In hotel applications, where multiple cards and users must access a given lock, there exists a need to provide security by allowing access only to currently valid cards. One way to provide security in hotel applications is to change the code stored in a lock when a new occupant accesses a room for the first time using a newly-issued card. The '898 patent discloses a programmable electronic lock which allows opening when a present key code is either equal to a stored lock code or is one unit greater than a stored lock code. A present key code is defined as a code which is computed by a lock from a card code stored on a magnetic card when a card is inserted into a card reader. A stored lock code is defined as the code against which a present key code is verified. If a present key code is equal to a stored lock code, a lock opens. If a present key code is one unit greater than a stored lock code, the lock opens and replaces the stored lock code with the present key code (one greater than the previous code).

In hotel room applications, a first occupant's card is invalidated with the change of the lock code. For example, when a second occupant for room 101 inserts his or her card into a room door lock, that card becomes the valid card for that lock, and the previous occupant's card is no longer valid.

The '898 invention discloses a second embodiment which allows opening and updating a lock code when a second card inserted into a lock results in a key code which is two units greater than a current lock code. This improved embodiment allows a third card to operate a lock when a second card is issued but never used.

Another function which the '898 patent discloses and the present invention improves on is the operation of a lock by different types of cards without interference between types. Examples of different types of cards are master cards (maids, porters, maintenance, bellhops) and guests' cards in a hotel. The '898 invention allows a master card to operate a lock without changing a lock code for a guest's card and vice versa. This is what is meant by preventing interference between types.

To prevent interference between types, the '898 invention reads a type code from a user's card, retrieves a stored lock code corresponding to that type of card, and compares the key code on the inserted card to the retrieved code. If the difference is within the required tolerance of one or two units, the lock code is updated to the present key code for that type of card only.

U.S. Pat. No. 5,198,643 issued on Mar. 30, 1993, in the name of Miron, discloses an adjustable electronic key and lock system which uses a microcomputer and a control program to control lock functions. To perform basic code verification, the microcomputer first compares a key level code to a lock level code stored in lock memory. If there is a match, the microcomputer next compares a key record number to a list of lock record numbers stored in lock memory. When it finds a match, the microcomputer compares a new key time stored on a card to a current key time code stored in memory to determine whether a key is new, current, or old. If the new key time is less than the current key time, the key is old and invalid. If the new key time is greater than the current key time, the key is valid and new and the microcomputer replaces the current key time with the new key time in memory. If the key times are equal, the key is valid and current. Upon validation, the Miron invention performs according to operational information stored with a particular key level, which may require further comparison before opening.

OBJECTS AND SUMMARY OF THE INVENTION

The present invention stores a list of valid lock codes for each type of card. The '898 stores only one lock code for each type of card. Instead of comparing a key code on an inserted card to a single lock code stored for each type of card, the present invention compares a key code to each code in a stored list of lock codes corresponding to a given type until a valid code is found, or the list is exhausted.

A further way in which the present invention improves upon the '898 invention is by providing additional logic circuitry which allows the connection of additional functions, according to the needs of a particular site. Some examples of functions that can be added are a real time clock function, which allows timed, access for certain cards or an office function which allows a master user to open a lock and keep it open for a desired period of time. The additional functions circuit permits one or more of these additional functions to be attached to a lock without affecting other lock functions. If no functions are enabled, the remainder of the circuit operates as it would without additional functions. The '898 invention contains no comparable circuit to the new additional functions circuit of the present invention.

The present invention improves upon both embodiments of the '898 invention by allowing the maximum difference between successive key codes which operate a lock to be set to a predetermined value, rather than limiting the allowable difference to one or two units. For example, this predetermined number could be set to 10 for a room lock to account the possibility of 9 guest cards being issued but never used. A more practical application is setting the predetermined number to a sufficiently large value to adapt a standard room lock for use in a common area where multiple users require access such as, for example, a pool area in a hotel.

The present invention performs validation independently of key time and offers time-related verification as an independent add-on function. The Miron invention is unnecessarily complex when compared to the simple modular design of the present invention, which allows a basic system to be tailored to the needs of a particular site. Furthermore, the present invention requires neither a microcomputer nor a control program to perform lock functions, as they are effected automatically by hardware.

Accordingly, it is an object of the present invention to provide a programmable electronic lock to overcome the drawbacks of the prior art.

It is a further object of the present invention to provide a programmable electronic lock which allows access to multiple users and provides security.

It is another object of the present invention to provide a programmable electronic lock which allows access to multiple users of different types without interference between types.

It is yet another object of the present invention to provide a programmable electronic lock which allows the connection of modular additional circuits to fit the needs of a particular site.

It is a further object of the present invention to provide a programmable electronic lock which is adaptable to multiple uses while remaining simple in operation and design.

Briefly stated, there is provided a programmable electronic lock which provides security among multiple users, allows independent use by multiple users of different types, and is modularly adaptable to various applications. Security is provided by the automatic updating of a lock code if an inserted card's key code bears a predetermined relation to the lock code. The present invention allows multiple types of users to access a given lock without affecting lock codes associated with other types or invalidating the stored lock codes of other users of the same type. For example, in a hotel room lock, a maid's key will not change the code for a guest's key, and other maids' keys will still open a lock after a first maid has accessed the lock if their lock codes are stored in the lock. The present invention also provides an additional functions circuit which allows add-on functions to be attached to the basic circuit to fit the needs of a particular site. Some examples of add-on functions include: a real time clock, a timetable function, a privacy function, an office function, a keyboard function, and a secret code function.

According to an embodiment of the invention, there is provided a programmable electronic lock, comprising: a card, having fields respectively encoded with a card code, a shift code, and a card type code, a card reader, means for storing the card code, means for storing the shift code, means for storing the card type code, a system code, means for storing the system code, means for receiving the card, system, and shift codes, and calculating a key code therefrom, means for storing the key code, a plurality of lock codes for the card type code, means for storing the plurality of lock codes for the card type code, means for receiving the card type code and retrieving a lock code from the plurality of lock codes for the card type code, means for receiving and comparing the key code and the lock code, the means for receiving and comparing the key code and the lock code producing an active output signal at a first output when the key code is equal in value to the lock code, the means for receiving and comparing the key code and the lock code producing an active signal at a second output when the key code value is within a predetermined tolerance value of the lock code value, means for setting and storing the predetermined tolerance value, means for opening a lock responsive to either of the active output signals from the means for receiving and comparing the key code and the lock code, means for automatically updating the lock code, by replacing the lock code with the key code, responsive to the second active output signal from the means for receiving and comparing the key and the lock codes.

According to a feature of the invention, there is provided a programmable electronic lock comprising: a card, having fields respectively encoded with a card code, a shift code, a card type code, and an additional functions code, a card reader, means for storing the card code, means for storing the shift code, means for storing the type code, means for storing the additional functions code, a system code, means for storing the system code, means for receiving the card, system, and shift codes, and producing a key code therefrom, means for storing the key code, a plurality of lock codes for the card type code, means for storing the plurality of lock codes for the card type code, means for receiving the card type code and retrieving a lock code from the plurality of lock codes for the card type code, means for receiving and comparing the key code and the lock code, the means for receiving and comparing the key code and the lock code producing an active output signal at a first output when the key code is equal in value to the lock code, the means for comparing the key code and the lock code producing an active signal at a second output when the key code value is within a predetermined tolerance value of the lock code value, means for setting and storing the predetermined tolerance value, means for opening a lock, responsive to either of the active output signals from the means for receiving and comparing the key code and the lock code, means for automatically updating the lock code, by replacing the lock code with the key code, responsive to the second active output signal from the means for receiving and comparing the key and the lock codes, means for connecting a plurality of modular additional elements to adapt a lock to the needs of a particular site.

According to a further feature of the invention, there is provided a programmable electronic lock comprising: means for reading a key code from a card, means for storing a lock code in the lock, means for storing an allowable maximum difference between the key code and the lock code, and means, responsive to a difference between the key code and the lock code being less than the allowable maximum difference for enabling activation of the electronic lock.

According to another feature of the invention, there is provided a programmable electronic lock comprising: a card, means for reading data from the card, the data including at least a card code and an additional functions code, means, responsive to the card code satisfying a predetermined condition for providing a first opening signal, means, responsive to satisfaction of at least one condition in the additional functions code, for providing a second opening signal, and means responsive to the presence of the first and second opening signals for enabling opening of the lock.

According to yet another feature of the invention, there is provided a programmable electronic lock comprising: a card, means for reading key data from the card, means for reading user identification data from the card, means for storing lock data in the lock, means, responsive to the lock data and the key data having a predetermined relationship, for enabling opening of the lock, and means responsive at least to attempted actuation of the lock, for storing the user identification data, whereby a record of attempted user data is stored in the lock.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT(S)

Figure 1:
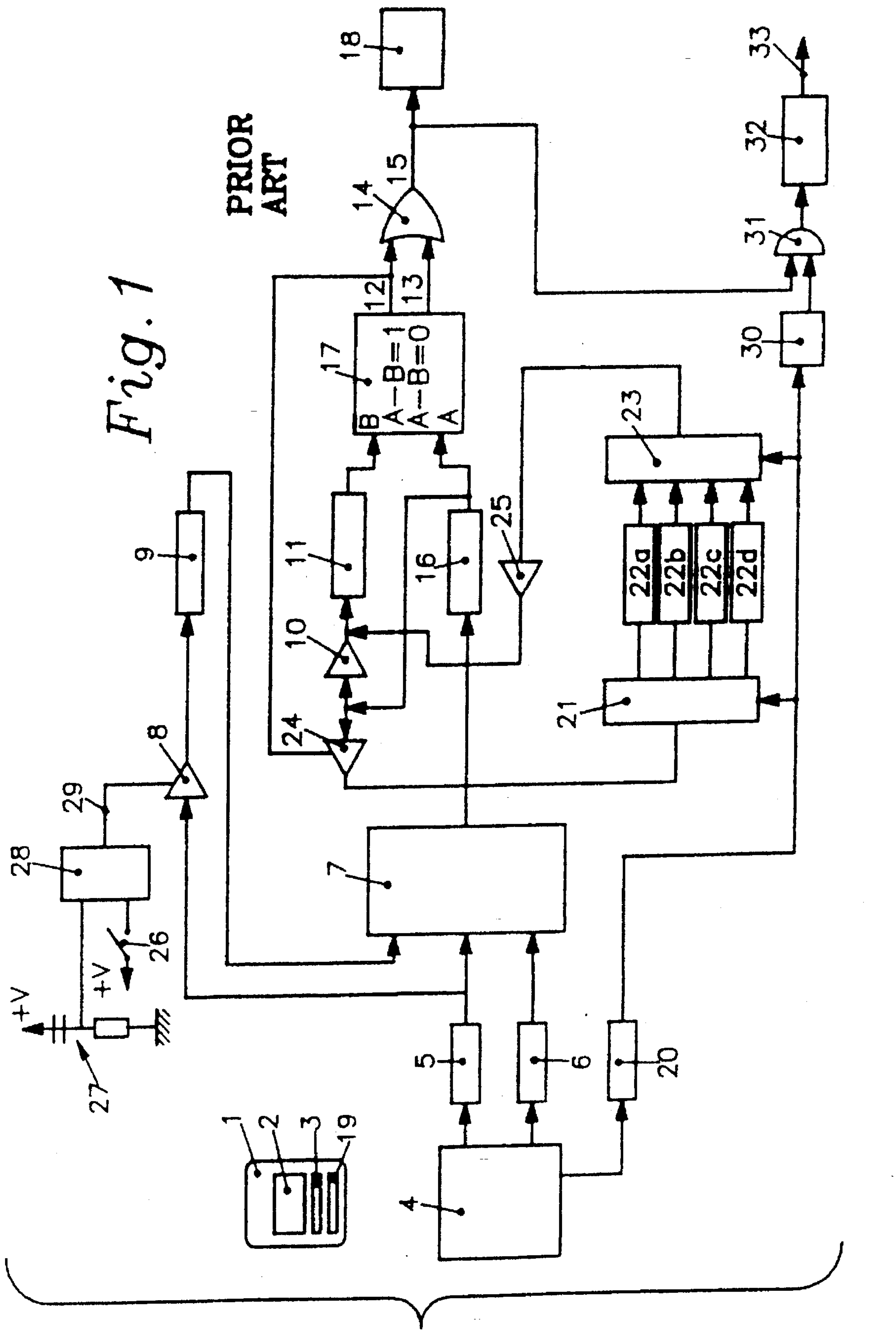
Fig. 1 PRIOR ART
FIG. 1 shows a block diagram of a programmable electronic lock according to the prior art.

Referring to FIG. 1, an embodiment of the prior-art '898 invention provides an electronic lock in which a card reader 4 reads a card code field 2, a shift code field 3, and a type code field 19 from a magnetic card 1, and stores the codes in registers 5, 6, 20, respectively. A means calculating a key code 7 uses a system code from a register 9 and the shift code read from shift field 3 stored in register 6 to convert the card code from register 5 into a key code, which is then stored in a register 16.

Register 20, which contains the type code read from type code field 19 is connected to the control inputs of a demultiplexer 21 and a multiplexer 23. Four registers 22A, 22B, 22C, and 22D are connected to the outputs of the demultiplexer 21 and to the inputs of the multiplexer 23. Each of registers 22A, 22B, 22C and 22D stores a lock code corresponding to a given type code. The type code selects one of the inputs of the multiplexer 21, which sends the contents through multiplexer 23 to one of registers 22A, 22B, 22C, or 22D through a control gate 25 and into a register 11.

The key code stored in register 16 and the lock code in register 11 are connected to inputs A and B of a comparator 17, which compares the key code to the lock code. If the key code and the lock code are equal, an output signal is produced at an output 13 of the comparator. Output 13 feeds an OR gate 14 which produces a signal when either of its inputs is active. The output 15 of OR gate 14 is connected to an electromechanical means for opening a lock 18.

If the key code is one unit greater than the lock code, a signal is produced at an output 12 of the comparator 17. Output 12 feeds the OR gate 15, which produces an active signal at its output 15 when either or both of its inputs are active. Since the output is connected to the opening means 18, a lock is enabled to open when the key code is one unit greater than the lock code.

If the key code is not equal to or one unit greater than the lock code, neither of the outputs of the comparator 17 are excited. Consequently, the lock does not open, and the lock code is not updated.

To allow automatic updating, the output 12 of the comparator 17 is connected to the enabling inputs of a control gates 10 and 24. When the key code is one unit greater than the lock code, the output 12 becomes active, and enables control gate 10 and 24. Control gate 10 is connected between registers 16 and 11 and allows the key code in register 16 to replace the lock code in register 11 when enabled. Control gate 24 is connected between register 16 and the demultiplexer 21. This allows the key code in register 16 to replace the lock code in one of registers 22A, 22B, 22C, or 22D, corresponding to the type code.

Another function provided by the '898 invention and the present invention is the updating of stored lock codes without exciting the comparator 17. To allow this function, register 20 is connected to the input of a discriminator 30, which produces an active output signal only when the input is greater than a preselected value. The output of the discriminator 30 is connected to one of two inputs of an AND gate 31. The other input of AND gate 31 is connected to the output of OR gate 15, which is excited when a card is valid. The output of AND gate 58 is connected to a time switch 32.

To update one of the codes in any of registers 21A–D, a valid card with a type code greater than a preset value of the discriminator 31 is introduced into the reader 4. Both inputs of AND gate 31 are excited, causing an active signal at its output, which excites time switch 31. Time switch 31 provides a delay during which a second card of any type can be introduced into the reader 4, and its key code is transferred via register 16, control gate 24, and demultiplexer 21 to update the selected lock code of register 22A, 22B, 22C, or 22D.

Another function provided by the '898 invention which is also provided by the present invention is a safety switch function controlled by operating a switch 26. One pole of switch 26 is connected to a power supply and the other pole is connected to one of two inputs of a bistable flip flop 28. The other input of the flip flop 28 is connected to the output of an RC circuit 27. The output of the flip flop 28 is connected to the enabling input of a control gate 8, which controls the setting of the system code.

With switch 26 open, when power is first applied, the momentarily high signal from RC circuit 27 triggers the bistable flip flop 28 into the set condition, which blocks operation of control gate 8, thereby preventing the changing of the system code through introduction of a card 1 into the reader 4. When the switch 26 is closed, the output of bistable flip flop is de-energized, and the control gate 8 is enabled, thereby allowing data stored on a card to change the system code.

The switch 26 provides a means for initializing the system code when a lock is installed and is opened thereafter to prevent unauthorized alteration thereafter. The switch is located for security reasons in a hidden location inside a door.

Figure 2:
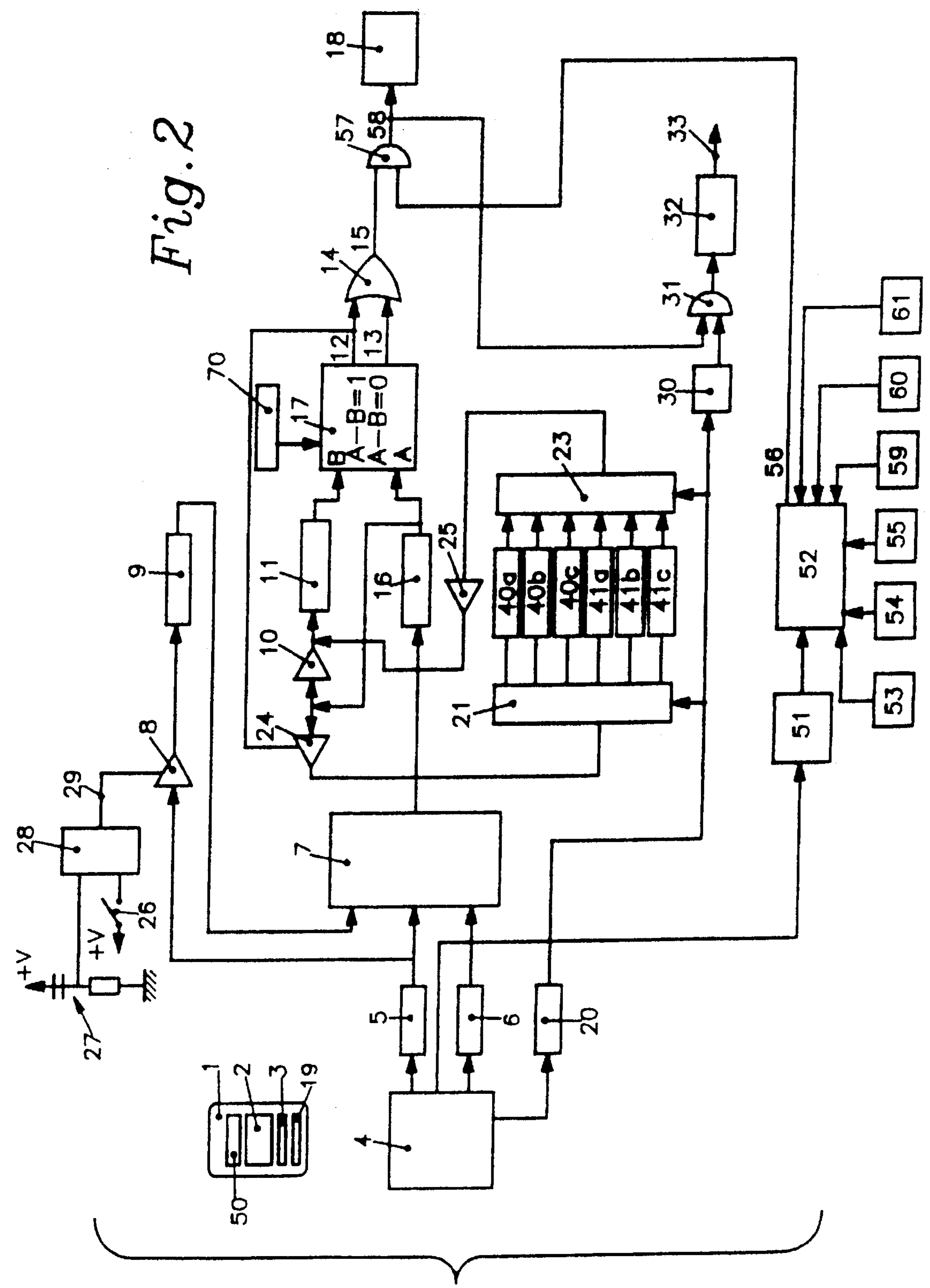
FIG. 2 shows a block diagram of a programmable electronic lock according to an embodiment of the present invention.

Referring now to FIG. 2, an embodiment of the present invention provides the same basic functions as the embodiment of FIG. 1; however, the present invention improves markedly those basic functions and adds additional functions. One improvement of the present invention over the embodiment of FIG. 1 is provided by the addition of a register 70 to increase the maximum allowable difference between key and lock codes. A value stored in register 70 defines the maximum allowable difference value which allows opening and updates a lock code. If the difference between a present key code and a present lock code is less than the value stored in register 70, the output 12 of the comparator 17 is excited, updating the lock code and possibly opening the lock, depending on other added features.

The embodiment of FIG. 1 has no register for setting the maximum allowable difference between key and lock codes and only allows opening when the difference equal to one unit. The '898 patent also discloses the possibility of the difference being set to two units, but does not disclose the use of an additional register for setting the maximum value.

Increasing the maximum allowable difference between key and lock codes allows a lock primarily designed for single successive users, like a hotel room lock, to control access to an area used by multiple non-successive users, like a swimming pool or fitness area. For example, guest cards for room 101 and 303 would have key codes which differed by more than one unit when introduced into a lock, yet both cards would access a lock for the pool area if the difference value stored in the pool area lock were set sufficiently high. The addition of register 70 thus provides a low-cost, simple solution to increase a lock's versatility.

Another function of the '898 invention which the present invention improves is the storing and decoding of lock codes corresponding to a given type code field 19. The '898 invention stores only one lock code for each type of card. The present invention adds additional registers to store a list of valid lock codes for each type of card. These additional registers are connected between the demultiplexer 21 and the multiplexer 23 and represented by reference designators 40a–c and 41a–c. The number of additional registers depends on the desired number of lock codes to be accommodated.

Instead of comparing a key code to one lock code for a given type, the present invention compares a key code to each code in a list until a valid code is found or the list of codes for that type is exhausted. Thus a hotel room lock could store a list of all valid maids' lock codes and still update successive guests' lock codes.

A completely new function which the present invention adds to the embodiment of FIG. 1 is a circuit for connecting modular elements that perform various additional functions, according to the needs of a particular site. This new circuit comprises an additional data code register 51, a calculation circuit 52, an AND gate 57, and an additional functions field 50 on a card. The data code register 51 is connected to the card reader 4 such that the contents of the additional functions field 50 on a card 1' are transferred to the register 51 when the card is read. The output of the register 51 is connected to the calculation circuit 52, which is also fed by one more modular additional function circuits, if present. The output 56 of the calculation circuit 52 is connected to one of two inputs of a two-input AND gate 57. The other input of AND gate 57 receives the output of OR gate 15, which produces a signal to excite electromechanical opening device 18 when a key code is valid.

The effect of ANDing the final output 56 of the additional functions circuit with the output of the original code detection circuit 58 is to allow opening only when both outputs produce active signals. Thus, if magnetic card 1' has a valid card code, defined as one that would otherwise open a lock, opening may still be blocked by the resulting signal from the additional functions circuit based on data stored in field 50.

If a lock has an additional functions circuit, but no modular additional function circuits are attached, the output 56 of calculation circuit 52 is always active, thereby allowing opening whenever a valid card is present, irrespective of data stored in field 50. The additional functions circuit is thus an independent, new circuit from that disclosed in the '898 patent which allows a plurality of new functions to be added through the attachment of modular elements, together with programming of additional functions field 50 of magnetic card 1'.

One possible element is a clock module 53. Adding a clock module allows a lock to analyze timing data, like the date of commencement of a card's validity and the date of termination of a card's validity. A card can include these dates in the additional functions field 50. The clock module keeps the current time and compares the dates encoded on a card to the current time and produces a signal at the output of the calculation unit 56 to allow or block opening.

A clock module can be used to define the beginning and end of a hotel guest's stay and allow advance issue of cards. For example if room key cards are issued in advance of the beginning of a guest's stay period, a card will not access a lock until scheduled check-in occurs, and access terminates when a stay period ends.

In addition to a clock module, a lock can also be fitted with a timetable module 54, which defines repetitive periods of validity for certain cards. For example, a timetable can be used to store periods of validity for maids' cards corresponding to their respective work shifts. This feature allows access when necessary, while providing security for guests.

Another possible element that complements a clock module is an openings memory module 60, which stores the time and identity of each card used to access a lock. The real time corresponding to each access is stored in memory provided by the openings memory module 60. This function allows hotels to monitor the activities of their employees and provide extra security.

Still another possible element that can be added is a privacy module 55, which allows a user to prevent opening of a lock by certain cards, using a switch. For example, a hotel guest who wishes to sleep late can use a privacy switch to prevent a maid from accessing a room lock. For safety and security reasons, cards must exist which are capable of overriding privacy module 55.

Another possible element that can be added is a keyboard module 61, which provides extra security when a card is lost or stolen by requiring a user to enter a secret code in addition to inserting a card to gain ingress to a room. To avoid increasing the memory of a lock, each user's secret code can be stored in field 50 on a card 1'.

Another possible module that can be added provides an office function 59, which allows a certain user to insert a card, open a lock, and keep the lock open for a desired period of time. Re-insertion of the same card terminates the office function by locking a door. This function is useful where the person in charge of a meeting wishes to leave a door unlocked during the period of a meeting and to lock the door at the end of the meeting.

Another feature that the present invention provides is to allow a guest card to access multiple rooms if desired. For example, a family may book a separate room for children, and the parents may desire to have access to the children's room. One possible solution is to provide two keys to the parents—one for their room and one for the children's room. Another solution is to encode two card codes in the card code field 2 on a card 1'. The shift, type, and additional function codes remain the same as those on a guest card for a single room. A lock, upon reading a card with multiple card codes, acts upon the first code as if it is the only code present. If the first code is invalid, the lock proceeds to the second code and determines its validity. In this way, a single card can provide access to multiple rooms.

Figure 3:
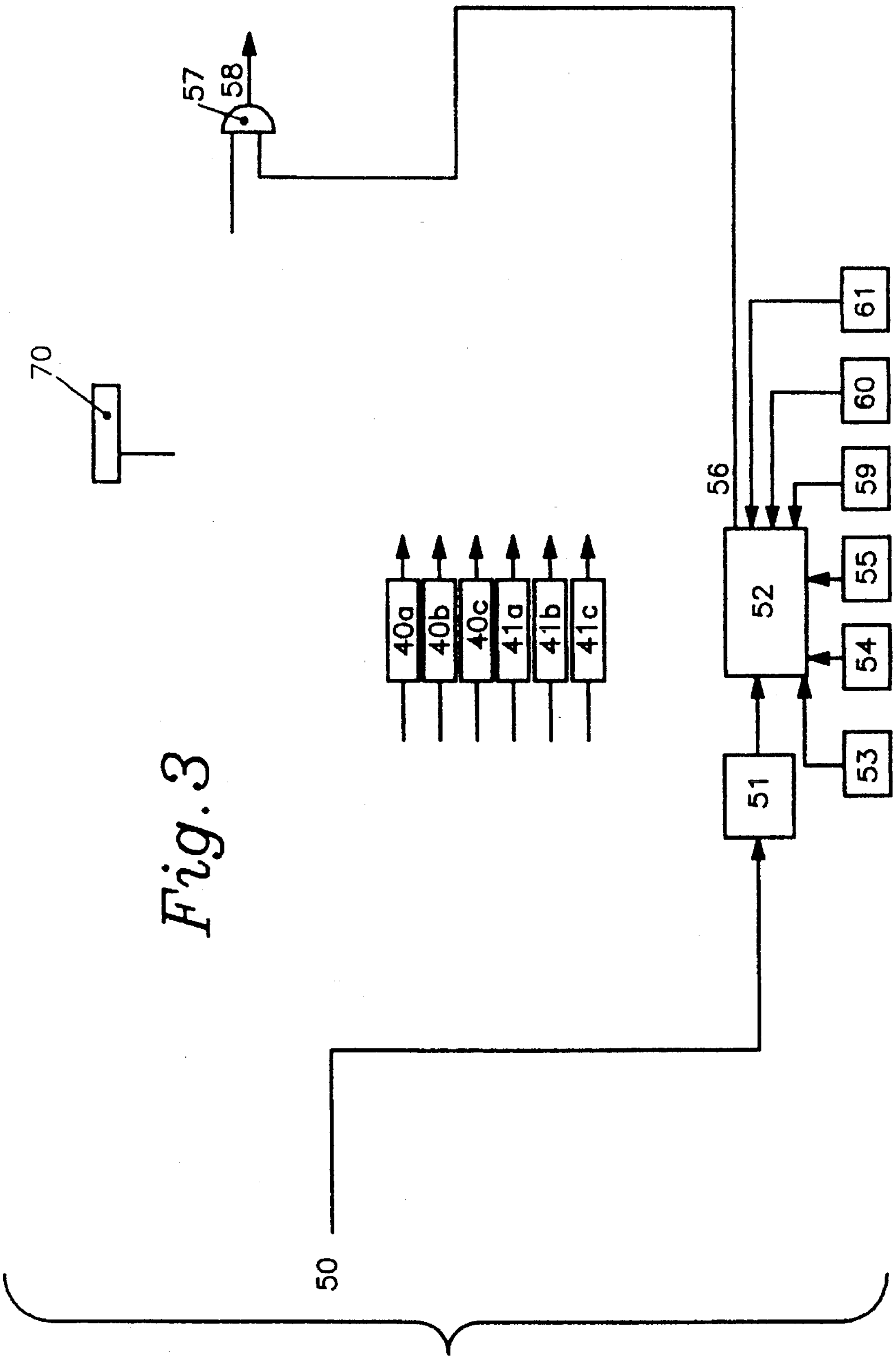
FIG. 3 shows elements of an embodiment of the present invention which are not disclosed in the '898 invention.

FIG. 3 shows the elements of the present invention of FIG. 2 that are added to, or are different from, the elements of the prior art of FIG. 1.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A programmable electronic lock, comprising:

a card, having fields respectively encoded with a card code, a shift code, and a card type code;

a card reader;

means for storing said card code;

means for storing said shift code;

means for storing said card type code;

a system code;

means for storing said system code;

means for receiving said card, system, and shift codes, and calculating a key code therefrom;

means for storing said key code;

a plurality of lock codes for said card type code;

means for storing said plurality of lock codes for said card type code;

means for receiving said card type code and retrieving a lock code from said plurality of lock codes for said card type code;

means for receiving and comparing said key code and said lock code;

said means for receiving and comparing said key code and said lock code producing an active output signal at a first output when said key code is equal in value to said lock code;

said means for receiving and comparing said key code and said lock code producing an active signal at a second output when said key code value is within a predetermined tolerance value of said lock code value;

means for setting and storing said predetermined tolerance value;

means for opening a lock responsive to either of said active output signals from said means for receiving and comparing said key code and said lock code;

means for automatically updating said lock code, by replacing said lock code with said key code, responsive to said second active output signal from said means for receiving and comparing said key and said lock codes.

2. A programmable electronic lock according to claim 1, wherein said means for storing said plurality of lock codes for said card type code comprises:

a plurality of registers, storing a list of lock codes for each card type code.

3. A programmable electronic lock according to claim 1, wherein said means for receiving and comparing said key code and said lock code comprises:

a comparator, having a control input;

said control input being connected to said means for setting and storing said predetermined tolerance value.

4. A programmable electronic lock according to claim 1, wherein said means for setting and storing said predetermined tolerance value comprises:

a register.

5. A programmable electronic lock according to claim 1, wherein said predetermined tolerance value is the difference produced by subtracting said key code value from said lock code value.

6. A programmable electronic lock comprising:

a card, having fields respectively encoded with a card code, a shift code, a card type code, and an additional functions code;

a card reader;

means for storing said card code;

means for storing said shift code;

means for storing said type code;

means for storing said additional functions code;

a system code;

means for storing said system code;

means for receiving said card, system, and shift codes, and producing a key code therefrom;

means for storing said key code;

a plurality of lock codes for said card type code;

means for storing said plurality of lock codes for said card type code;

means for receiving said card type code and retrieving a lock code from said plurality of lock codes for said card type code;

means for receiving and comparing said key code and said lock code;

said means for receiving and comparing said key code and said lock code producing an active output signal at a first output when said key code is equal in value to said lock code;

said means for comparing said key code and said lock code producing an active signal at a second output when said key code value is within a predetermined tolerance value of said lock code value;

means for setting and storing said predetermined tolerance value;

means for opening a lock, responsive to either of said active output signals from said means for receiving and comparing said key code and said lock code;

means for automatically updating said lock code, by replacing said lock code with said key code, responsive to said second active output signal from said means for receiving and comparing said key and said lock codes; and means for connecting a plurality of modular additional elements to adapt a lock to the needs of a particular site.

7. A programmable electronic lock according to claim 6, wherein said means for storing said plurality of lock codes for said card type code comprises:

a plurality of registers, storing a list of lock codes for each card type code.

8. A programmable electronic lock according to claim 6, wherein said means for receiving and comparing said key code and said lock code comprises:

a comparator, having a control input;

said control input being connected to said means for setting and storing said predetermined tolerance value.

9. A programmable electronic lock according to claim 6, wherein said means for setting and storing said predetermined tolerance value comprises:

a register.

10. A programmable electronic lock according to claim 6, wherein said predetermined tolerance value is the difference produced by subtracting said key code value from said lock code value.

11. A programmable electronic lock according to claim 6, wherein said means for connecting said modular additional elements comprises:

a calculation circuit, producing an active output signal upon receiving said additional functions code and an active output signal from one or more of said plurality of modular elements;

an AND gate;

said AND gate receiving at a first input said output signal from said from said calculation circuit;

said AND gate receiving at a second input both of said output signals from said means for receiving and comparing said key code and said lock code of claim 2;

said AND gate producing an active output signal upon said first input and said second input simultaneously receiving active signals;

said active output signal of said and gate energizing said means for opening a lock.

12. A programmable electronic lock according to claim 6 where said modular function elements comprise;

a clock module;

a timetable module;

a privacy module;

an openings memory module;

a keyboard module; and an office function module.

13. A programmable electronic lock according to claim 6 having at least one additional functions module.

14. A programmable electronic lock comprising:

means for reading a key code from a card;

means for storing a lock code in said lock;

means for setting and storing an allowable maximum difference between said key code and said lock code; and means, responsive to a difference between said key code and said lock code being less than said allowable maximum difference for enabling activation of said electronic lock.

15. A programmable electronic lock according to claim 14 comprising:

means for reading an additional functions code from said card;

means, responsive to said key code satisfying a predetermined condition for providing a first opening signal;

means, responsive to satisfaction of at least one condition in said additional functions code, for providing a second opening signal; and means responsive to the presence of said first and second opening signals for enabling opening of said lock.

16. Apparatus according to claim 15, wherein said at least one condition includes a valid time before which said second opening signal is prohibited.

17. Apparatus according to claim 15, wherein said at least one condition includes an invalid time after which said second opening signal is prohibited.

18. Apparatus according to claim 17, wherein said at least one condition further includes a valid time, before said invalid time, before which said second opening signal is prohibited, whereby said second opening signal is permitted between said valid time and said invalid time.

19. Apparatus according to claim 15, wherein said at least one condition includes a timetable of permitted opening times.

20. Apparatus according to claim 15, wherein said at least one condition includes a privacy function whereby a lock operator is enabled to prevent opening of said lock under certain circumstances.

21. Apparatus according to claim 15, wherein said at least one condition includes codes useable with a definable plurality of locks, said definable plurality being less than all of said locks in a building.

* * * * *